US010433230B2

(12) United States Patent
Gao et al.

(10) Patent No.: US 10,433,230 B2
(45) Date of Patent: Oct. 1, 2019

(54) METHODS, DEVICES, AND SYSTEMS FOR SUPPORTING WIRELESS ROAMING

(71) Applicant: CASSIA NETWORKS INC., San Jose, CA (US)

(72) Inventors: Feng Gao, Sammamish, WA (US);
Fuyong Zhao, San Jose, CA (US);
Xiansen Cai, Beijing (CN); Haitao Shi, Beijing (CN)

(73) Assignee: Cassia Networks Inc., San Jose, CA (US)

( * ) Notice: Subject to any disclaimer, the term of this patent is extended or adjusted under 35 U.S.C. 154(b) by 0 days.

(21) Appl. No.: 15/839,161

(22) Filed: Dec. 12, 2017

(65) Prior Publication Data

US 2019/0182740 A1    Jun. 13, 2019

(51) Int. Cl.
*H04W 36/00* (2009.01)
*H04W 36/30* (2009.01)
(Continued)

(52) U.S. Cl.
CPC ....... *H04W 36/30* (2013.01); *H04W 36/0083* (2013.01); *H04W 36/08* (2013.01);
(Continued)

(58) Field of Classification Search
CPC ....... H04W 4/80; H04W 8/005; H04W 24/00; H04W 84/18; H04W 64/00; H04W 24/10; H04W 36/0061; H04W 88/022
(Continued)

(56) References Cited

U.S. PATENT DOCUMENTS 9,749,878 B2 *    8/2017    Zhu ................ H04W 24/02
2004/0239480 A1 *  12/2004   Beenau ............. G06Q 20/00
                                                  340/5.53
(Continued)

FOREIGN PATENT DOCUMENTS

EP    3253120 A1    12/2017
WO    2014114142 A1    7/2014

OTHER PUBLICATIONS

Extended European Search Report dated Feb. 22, 2019, issued in related European Application No. 18210875.3 (8 pages).

*Primary Examiner* — Joseph Arevalo
(74) *Attorney, Agent, or Firm* — Sheppard Mullin Richter & Hampton LLP

(57) ABSTRACT

A method for supporting wireless roaming among coverage areas of a plurality of access points may comprise detecting, by a first access point of the plurality of access points, signal strength of signals from a client device that is wirelessly connected to the first access point; comparing the signal strength with a threshold, and if the signal strength is less than the threshold, disconnecting, by the first access point, the client device from the first access point; transmitting, by the first access point, a signal indicating the disconnection of the client device to an access controller; updating, by the access controller, connection status information to indicate the disconnection of the client device from the first access point; transmitting, by the access controller, the connection status information of the client device to the plurality of access points; and connecting the client device with a second access point of the plurality of access points.

17 Claims, 5 Drawing Sheets

(51) Int. Cl.
*H04W 36/08* (2009.01)
*H04W 72/08* (2009.01)
*H04W 36/18* (2009.01)
*H04W 28/02* (2009.01)
*H04W 76/30* (2018.01)

(52) U.S. Cl.
CPC ......... *H04W 36/18* (2013.01); *H04W 72/085* (2013.01); *H04W 28/0226* (2013.01); *H04W 76/30* (2018.02)

(58) Field of Classification Search
USPC ....... 455/39, 436, 456.1, 41.2, 67.12, 550.1, 455/552.1, 67.11
See application file for complete search history.

(56) References Cited

U.S. PATENT DOCUMENTS

| | | | |
|---|---|---|---|
| 2004/0239481 A1* | 12/2004 | Beenau | G06Q 20/00 340/5.53 |
| 2006/0025127 A1 | 2/2006 | Cromer et al. | |
| 2006/0062363 A1* | 3/2006 | Albrett | G06Q 30/02 379/101.01 |
| 2006/0273880 A1* | 12/2006 | Yuhara | B60R 25/255 340/5.83 |
| 2010/0266169 A1* | 10/2010 | Abiko | G06K 9/00026 382/124 |
| 2012/0218909 A1* | 8/2012 | Yamaguchi | H04W 76/10 370/252 |
| 2013/0259005 A1 | 10/2013 | Kulkarni | |
| 2014/0141714 A1* | 5/2014 | Ghosh | H04L 29/08 455/39 |
| 2015/0036514 A1* | 2/2015 | Zhu | H04W 52/244 370/252 |
| 2015/0081295 A1* | 3/2015 | Yun | G10L 17/005 704/236 |
| 2015/0350974 A1* | 12/2015 | Patil | H04W 36/0083 370/331 |
| 2017/0347385 A1 | 11/2017 | Dunsbergen et al. | |

* cited by examiner

METHODS, DEVICES, AND SYSTEMS FOR SUPPORTING WIRELESS ROAMING

TECHNICAL FIELD

The present disclosure relates generally to methods, devices, and systems for supporting wireless roaming with continuous data communication and, more particularly to methods, devices, and systems for facilitating wireless roaming in a Bluetooth network.

BACKGROUND

Wireless devices, such as Bluetooth devices including Bluetooth speakers, smart locks, and various smart Bluetooth sensors, and wearable devices, have become widely used in many applications. These wireless devices are often connected to a computer network via one or more wireless access point (WAP) (or simply called access point (AP)). The access point usually connects to a router, which is connected to the computer network, such as the Internet. Most of the Bluetooth devices are mobile and may need to move from area to area. During the movement of a Bluetooth device, the data communication between the Bluetooth device and access points should not be interrupted. To provide continuous data communication, a swift and smooth handover between different access point connections is desired.

SUMMARY

Various embodiments of the present disclosure can include systems, methods, and non-transitory computer readable media configured to support wireless roaming. A method for supporting wireless roaming among coverage areas of a plurality of access points may comprise detecting, by a first access point of the plurality of access points, signal strength of signals from a client device that is wirelessly connected to the first access point; comparing the signal strength with a threshold, and if the signal strength is less than the threshold, disconnecting, by the first access point, the client device from the first access point; transmitting, by the first access point, a signal indicating the disconnection of the client device to an access controller; updating, by the access controller, connection status information to indicate the disconnection of the client device from the first access point; transmitting, by the access controller, the connection status information of the client device to the plurality of access points; and connecting the client device with a second access point of the plurality of access points.

A system for supporting wireless roaming may comprise a plurality of access points each including a processor, a memory, and a wireless transceiver, and a central device including a processor and a memory. Each access point may be configured to detect signal strength of signals from a client device that is wirelessly connected to the access point, compare the signal strength with a threshold, and if the signal strength is less than the threshold, disconnect the client device from the first access point, and transmit a signal indicating the disconnection of the client device to an access controller on the central device. The access controller may be configured to update connection status information to indicate the disconnection of the client device from the first access point, and transmit the connection status information of the client device to the plurality of access points.

According one aspect, the wireless communication in the disclosed method and supported by the disclosed system is Bluetooth communication. With the system of the present disclosure, according to some embodiments, one of the access points maintains a connection or communication with the client device. When this client device moves to a different area that is covered by another access point, the latter will take over the connection as well as the connection and security properties. The disclosed roaming system has multiple Bluetooth access point devices deployed in the roaming area. An access controller coordinates the roaming and handover between access points, and updates connection status of the client devices. The roaming and handover activities happen in overlapping areas of more than one access point's coverage.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

The illustrated components and steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 1:
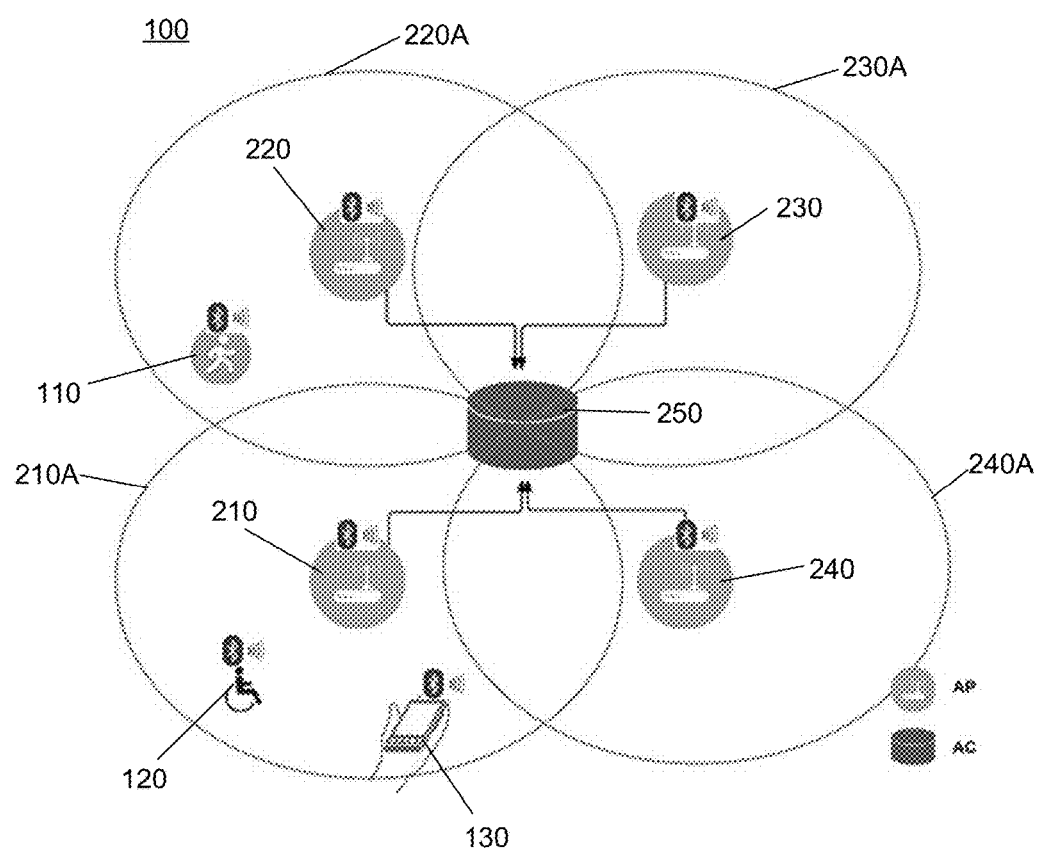
FIG. 1 illustrates an exemplary system environment for implementing methods and systems consistent with the present disclosure.

FIG. 1 illustrates an exemplary system environment 100 for implementing methods and systems consistent with the present disclosure. The system environment 100 shown in FIG. 1 includes a plurality of client devices 110, 120, and 130, a plurality of access points 210, 220, 230, and 240, and a central device 250.

The client devices 110, 120, and 130 can include computers, mobile phones, tablets, wearable devices such as smart watches, speakers, and other Internet of Things (IoT) devices. The client devices have one or more wireless connecting capabilities, such as Bluetooth connecting capabilities. For example, the client devices each may include a Bluetooth transceiver.

The access points 210, 220, 230, and 240 each may be a hardware device that can connect to the client devices through a wireless standard, including Wi-Fi and/or Bluetooth. In the present application, Bluetooth is used as an example. A person having ordinary in the art should appreciate that other wireless protocols can also be used and the disclosed inventions can apply to other wireless protocols. As seen in FIG. 1, the access points access points 210, 220, 230, and 240 each have a coverage area, respectively referred to as 210A, 220A, 230A, and 240A. Within the coverage area, the signal strength of the client devices and access points is sufficient for wireless communication. Outside of the coverage area, the signal strength may not be sufficient to maintain the communication between a client device and an access point. The access points may be arranged to cover a desired area, for example, the whole area of a building or a district. The coverage areas may overlap with each other to guarantee that all the intended areas are covered by the access points.

The access points can be commercially available access points. An access point may include a microcontroller, a memory, a wireless transceiver and multiple LAN and WLAN interfaces.

The access points 210, 220, 230, and 240 are connected with the central device 250 via wire or wireless connections. The central device 250 may be a router, which connects the access points 210, 220, 230, and 240 to other devices or networks, for example, a control device, the Internet, or another local area network. In another embodiment, the central device 250 may be a Bluetooth hub device as described in U.S. Pat. No. 9,730,003, titled Methods, Devices and Systems for Supporting Wireless Communication, and issued to the Applicant of this application. The access points 210, 220, 230, and 240 may also be the Bluetooth hub device as described in U.S. Pat. No. 9,730,003. U.S. Pat. No. 9,730,003 is incorporated by reference into this application. The Bluetooth hub device 250 may connect the access points to a control device, such as a computer, a smart phone, or a tablet, which can control the access points and client devices through the Bluetooth hub device 250.

The central device 250 may include an access controller, which controls access authentication of the client devices. The central device 250 may also include a microcontroller and a memory. The central device 250 may store an access control list (ACL), that includes MAC addresses of the client devices and their respective access rights. The central device 250 may include one or more wireless transceiver, modem, and input/output for communicating with the access points, the control device, and the networks. The access controller is a software service that coordinates the operations on the Access Points.

Figure 2:
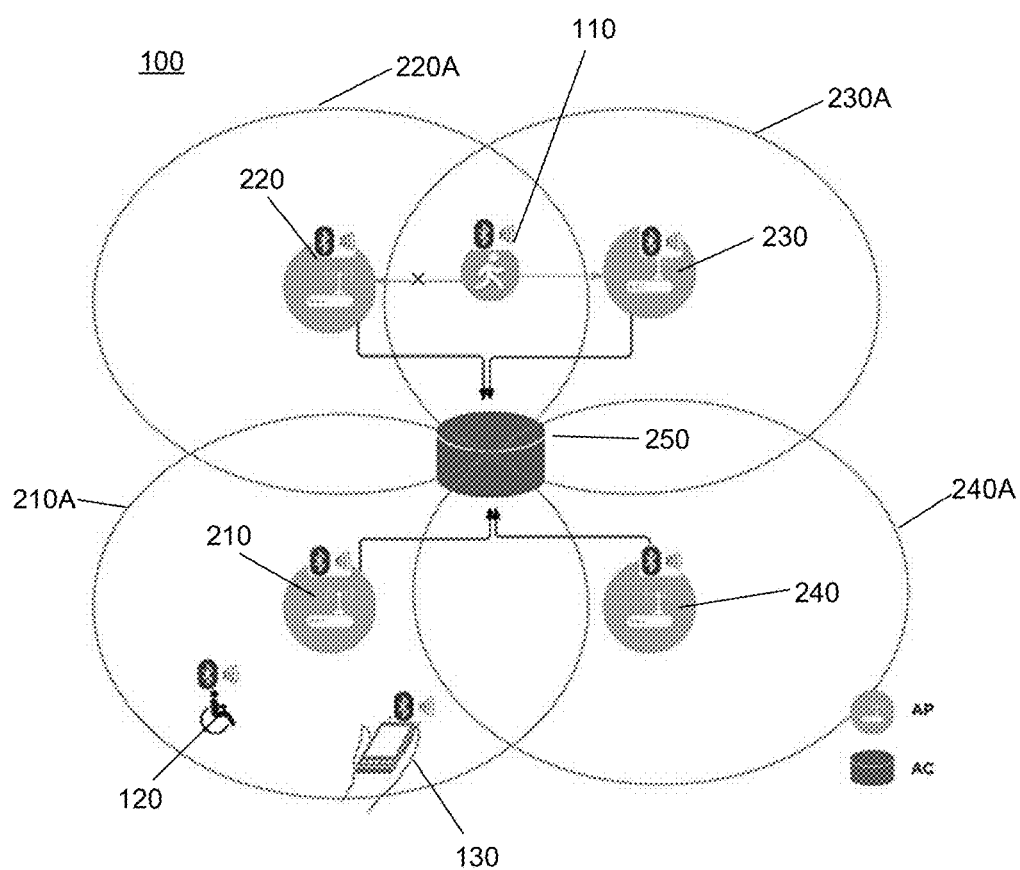
FIG. 2 illustrates another exemplary system environment for implementing methods and systems consistent with the present disclosure.

Client devices may roam from a coverage area of one access point to a coverage area of another access point. As seen in FIG. 2, client device 110 moves from coverage area 220A of a first access point 220 into coverage area 230A of a second access point 230. Roaming technologies should be implemented in the network devices to provide continuous coverage when a client device moves among different coverage areas.

The following uses client device 110 as an example to describe roaming between coverage areas of two access points 220 and 230. For example, client device 110, which is a Bluetooth device, when it is not connected to any access point, it sends out advertisement packets periodically. In some embodiments, the advertisement packet may include user/custom data. When client device 110 is moving from coverage area 220A to coverage area 230A, in the overlapping coverage area of access points 220 and 230, both access points 220 and 230 may receive the advertisement packets. Both access points 220 and 230 will forward the received advertisement packets to the access controller of central device 250. The access controller will keep track of the received packets, drop the redundant copies, and forward the packets to their intended destination. For example, central device 250 may be a Bluetooth hub connected to a control device, e.g., a cell phone. The accessor controller may forward the advertisement packets to the cell phone.

It is possible that the access controller may receive multiple copies of the same advertisement packet relayed by different access points, when those access points are all in the range of the advertiser device (e.g., client device 110). The access controller may apply a policy to filter the duplicate advertisement packets by checking the Cyclic Redundancy Code (CRC) of the advertisement raw data. As an example, the policy may include ignoring or deleting duplicate advertisement packets. CRC is a code added to data, for example, by the access points, that is used to detect errors during data transmission. The access controller can maintain a record of received advertisement packets with the advertiser's address and CRC. Once the access controller detects that the advertisement packets match any of the previously received ones in its record, it will apply the filtering policy as configured.

The access controller of central device 250 may forward the advertisement packets to a control device, such as a smart phone. A user of the control device may approve the connection with the client device. The control device and the client device may have been paired before. In this situation, the control device and the client device may automatically be connected through the central device and the access point. In some other embodiments, after authentication, the control device may connect with a client device directly through an access point.

In the connection between the client device and access point, for example, the client device may be in a peripheral role (can also be called a slave) and the access point is in a central role (can also be called a master). The client device may roam among coverage areas of different access points, for example, as shown in FIG. 2. The roaming in this situation needs to realize seamless handoff from the access point as the client device is leaving, and minimize the impact to user data communication due to the change of access point connections.

The access points 210, 220, 230, and 240 may detect signal strength and generate a received signal strength indicator (RSSI) for its connected client devices. The RSSI value may be set with a threshold. The access points may store the RSSI threshold in its memory. When the signal from a client device becomes lower than the RSSI threshold, the access point will disconnect from the client device and transmit a signal indicating the disconnection of the client device to the access controller.

The access controller may store connection status of each client device in the area it covers on the memory of the central device. For example, the access controller may store a roaming table including client device's identification The roaming table may also include connection status of the client devices including whether a client device is connected with any access point, and connected to which access point. After the access controller receives signals from an access point indicating a connection status change, the access controller will update the connection status in the roaming table. The access controller will then broadcast the updated roaming table to the access points. In some other embodiments, the access controller may broadcast only recent connection status change information instead of the whole roaming table. For example, the access controller may broadcast a signal indicating that a particular client device has been disconnected from an access point. The access points in the area will receive the signal or the updated roaming table, and if they see the client device that was disconnected by one of the access point, they will start connect with the client device. Once an access point is connected with the client device, it will update the roaming table on the access point and notify the access controller immediately.

For example, in FIGS. 1 and 2, client device 110 may be first connected with access point 220. When client device 110 moves further away from access point 220, the RSSI value of signals from client device 110 to access point 220 may become less than the RSSI threshold, and access point 220 may drop off the connection with client device 110. Access point 220 may immediately transmit a signal indicating the disconnection to update the roaming table on central device 250, which in turn broadcasts the updated roaming table to all access points. Access point 230 may detect that client device 110 is within its coverage area. Access point 230 connects with client device 110, and may generate a signal indicating that client device 110 is connected with access point 230 forward the signal to central device 250 for it to update the roaming table. Roaming table is used merely as an example. A person having ordinary skill in the art should appreciate that other data storage format can be used. For example, a list can be used to maintain connection status information.

In some embodiments, when the client device is in the peripheral role (i.e., connected with an access point), it may also support a broadcaster role. In other words, the client device can be configured to send advertisement packets while it is connected with an access point. The other adjacent access points can receive the client device's advertisement packets. Each AP in the range of the advertising device may receive the advertisement packets with the RSSI measurement and report this measurement to the controlling access controller. The access controller may compare the measurements it receives and coordinate with APs to manage the connection. In some embodiments, the access point with the highest RSSI can take over the connection.

In some other embodiments, if the client device does not support advertising when it's connected, the RSSI threshold can be determined by a site survey. For example, in an overlapping area where multiple access points have their signal coverage, maximum $RSSI_{max}$ and minimum $RSSI_{min}$ of each access point in the overlapping area can be determined. The RSSI threshold can be set as the medium of all of $RSSI_{max}$ and $RSSI_{min}$ of the multiple access points.

In the embodiments of the present application, RSSI value and threshold are used to determine whether a handover between different access points should be performed. A person having ordinary skill in the art should appreciate that other connection quality measurements can be used. For example, a handover can be based on other signal strength measurement or distance measurement between the client device and access points.

In this roaming solution, the Bluetooth client device does not need to make any changes in order to support roaming. When roaming is supported by the connected access points, the access controller will send configuration updates to the access points that are being managed. The configuration includes the handover RSSI threshold which limits the range of the coverage of the access points.

For all the access points in the area, for example, the access points 210, 220, 230, and 240 that support roaming, they share the same Bluetooth physical address and the other Bluetooth parameters of the client devices as needed. The shared information can be forwarded by the central device 250 to the access points. So the client device will not see the difference between different access points when it roams from one access point's coverage area to another access point's coverage area.

As discussed above, once the RSSI value is below the threshold, the access point will drop the connection and transmit roaming update to the access controller. The roaming update may include the connection parameters, security request information, and client device identification/Bluetooth address. Connection parameters may include slave latency, connection interval, supervision timeout, transmit window size, etc. Upon receiving this roaming update, the access controller will send the updated roaming information to the access points that are in the area. Each access point may maintain information, e.g., a roaming table of the client device, which may include information on connection parameters, security request information, client device identification/Bluetooth address, connection and connection status between client devices and access points.

When an access point receives an advertisement packet from a client device, it will check the roaming table. If a record of supported roaming device is on the list, it will initiate a connection with the corresponding connection parameters and security settings.

When Bluetooth security is enabled on the client device, the connection property information will be sent to the access controller. Once a new connection is set up, the access controller will inform the access point about the pairing association model. If security information, such as a Link Key, Long Term Key (LTK), or other keys, are generated, the access point will send the security information to the access controller via a secure channel. The accessor controller may send the security information to all other access points.

Figure 3:
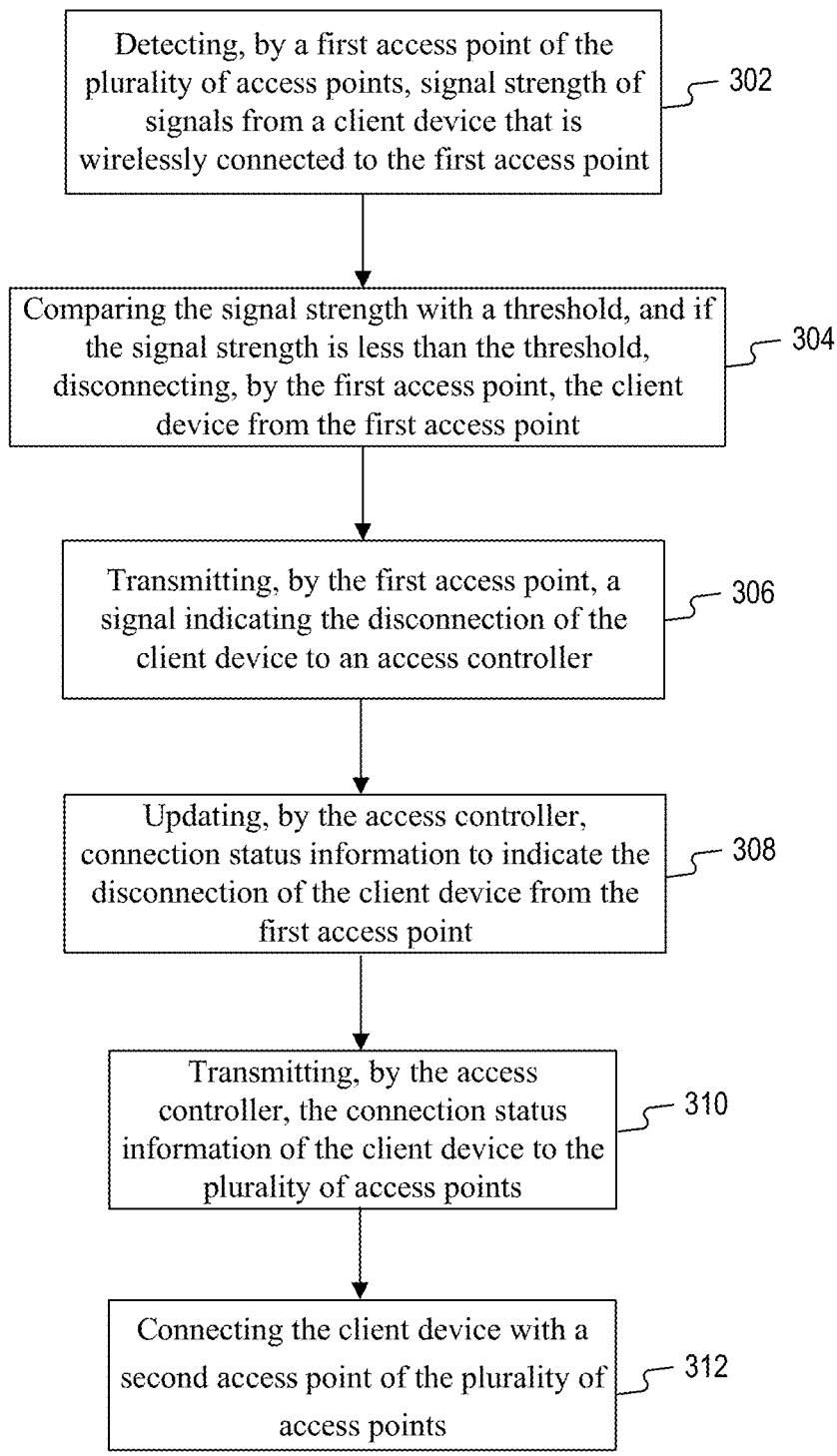
FIG. 3 illustrates an exemplary block diagram for implementing wireless roaming in accordance with an embodiment of the present disclosure.

The present disclosure also provide a method for wireless roaming. As shown in FIG. 3, according to some embodiments, the method for supporting wireless roaming among coverage areas of a plurality of access points include the following steps.

Step 302: a first access point, for example access point 220 in FIGS. 1 and 2, detects signal strength of signals from a client device, e.g., client device 110, that is wirelessly connected to the first access point 220.

Step 304: the first access point 220 may compare the signal strength with a threshold, and if the signal strength is less than the threshold, disconnect the client device from the first access point 220.

Step 306: the first access point 220 transmits a signal indicating the disconnection of the client device to an access controller, for example, the access controller on central device 250.

Step 308: the access controller receives the signal, and updates connection status information to indicate the disconnection of the client device from the first access point 220.

Step 310: the access controller transmits the connection status information of the client device to the plurality of access points.

Step 312: a second access point, for example, access point 230 connects with the client device.

According to some embodiments, access point 230 may store connection status information of client devices in its memory. After access point 230 connects with the client device 110, it updates the connection status information. Access point 230 transmits the updated connection status information of the client device to the access controller, and the access controller may transmit the updated connection status information to the other access points.

According to some embodiments, the access points when first connected with a client device, may transmit connection property information associated with the client device to the access controller. The access controller may transmit the connection property information associated with the client device to the plurality of access points. A client device may have security information. For example, the client device may require a security key to encrypt the information being sent to any access point. The access point, when first connected with the client device, may transmit the security information associated with the client device to the access controller. The access controller may transmit the security information associated with the client device to the plurality of access points, so that when the client device roams to a coverage area of an access point, that access point connect to the client device.

As discussed above, in the embodiments of the present disclosure, the access points can generate a received signal strength indicator (RSSI) to indicate signal strength of the signals from client devices, and a RSSI threshold is used by the access point to determine whether to disconnect a client device.

Figure 4:
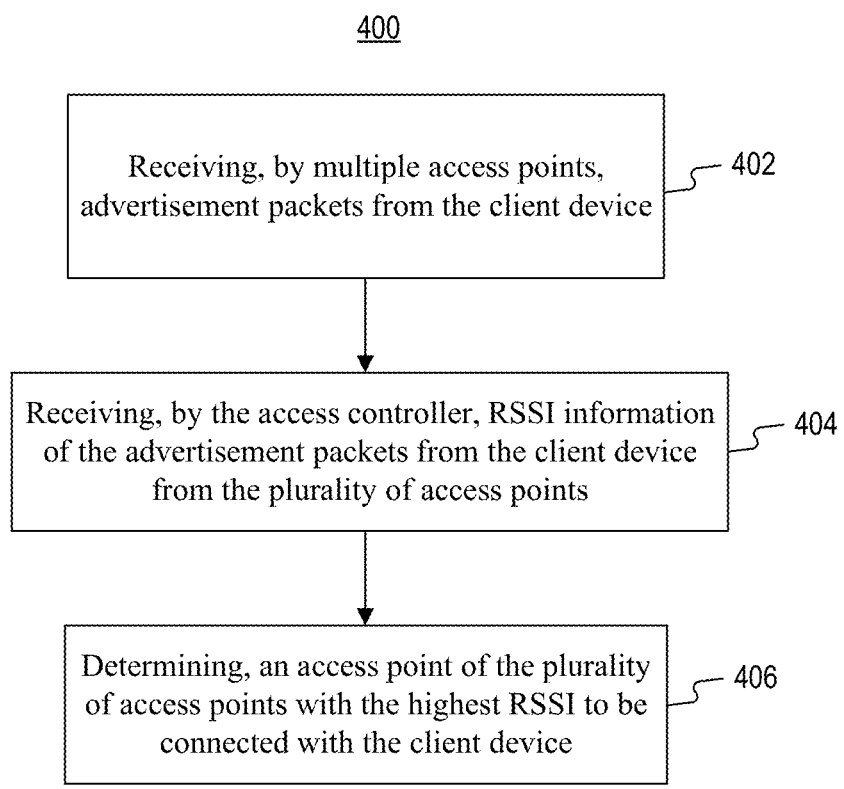
FIG. 4 illustrates another exemplary block diagram for implementing wireless roaming in accordance with an embodiment of the present disclosure.

Multiple access points of the plurality of access points may have an overlapping coverage area. If a client device is in the overlapping coverage area, its advertisement packets may be received by the multiple access points. The present disclosure further provides a method for determining an access point to connect to the client device based on RSSI values. According to some embodiments, the method 400 as shown in FIG. 4 may include:

Step 402: the multiple access points receive advertisement packets from the client device. The received advertisement packets may include RSSI information indicating signal strength of the received advertisement packets. The multiple access points may forward the RSSI information to the access controller.

Step 404: the access controller receives the RSSI information of the advertisement packets from the client device from the plurality of access points.

Step 406: the access controller determines an access point of the multiple access points with the highest RSSI to be connected with the client device.

The present disclosure further provides methods for determining RSSI threshold. As discussed above, multiple access points of the plurality of access points may have an overlapping coverage area. Each of the multiple access points has a maximum RSSI and a minimum RSSI of signals from the client device when the client device is within the overlapping coverage area. In one embodiment, the RSSI threshold is a medium of the maximum RSSIs and minimum RSSIs of the multiple access points. In another embodiment, the RSSI threshold can be a medium of the maximum RSSI and minimum RSSI of one of the multiple access points.

Figure 5:
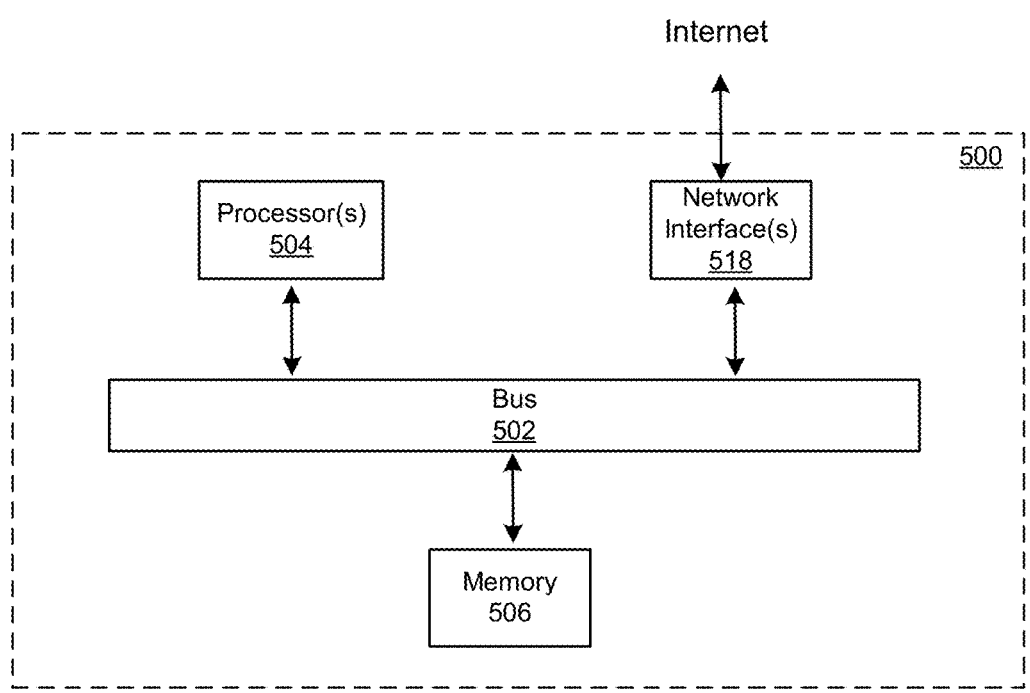
FIG. 5 illustrates an exemplary block diagram of computing device in accordance with an embodiment of the present disclosure.

FIG. 5 is a block diagram that illustrates a computing device 500 upon which any of the embodiments described herein may be implemented. The computing device 500 includes a bus 502 or other communication mechanism for communicating information, one or more hardware processors 504 coupled with bus 502 for processing information, a memory 506 for storing information and program code, and a network interface 518. The device 500 may be used to implement the access points 210, 220, 230, and 240, and central device 250. In the case the device 500 is used to implement central device 250, the processor 504 and the memory 506 may constitute the accessor controller. The device 500 may also be used to implement the client devices described above.

Processor(s) 504 may be, for example, one or more general purpose microprocessors. Memory 506 may include a random access memory (RAM), cache, and/or other storage devices, for storing information and instructions to be executed by processor 504. Memory 506 also may be used for storing temporary variables or other intermediate information during execution of instructions to be executed by processor 504. Such instructions, when stored in storage media accessible to processor 504, render device 500 into a special-purpose machine that is customized to perform the operations specified in the instructions.

Memory 506 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information. The device 500 can send messages and receive data, including program code, through the network(s), network link and communication interface 518. Device 500 may include two or more communication interfaces 518.

In the example that device 500 is an access point as discussed above, one communication interface 518 may be a wireless transceiver, for example, a Bluetooth transceiver, for connecting with client devices. Device 500 may include another communication interface 518, for example, a WiFi transceiver or a wire network port for connecting with central device 250.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in one or more memory (e.g., a non-transitory computer-readable storage medium described above) in the access points and/or central device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A method for supporting wireless roaming among coverage areas of a plurality of access points, comprising:
   detecting, by a first access point of the plurality of access points, signal strength of signals from a client device that is wirelessly connected to the first access point;
   comparing the signal strength with a threshold, and if the signal strength is less than the threshold, disconnecting, by the first access point, the client device from the first access point;
   transmitting, by the first access point, a signal indicating the disconnection of the client device to an access controller;
   updating, by the access controller, connection status information to indicate the disconnection of the client device from the first access point;
   transmitting, by the access controller, the connection status information of the client device to the plurality of access points; and
   in response to receiving the connection status information that indicates the disconnection of the client device from the first access point, connecting, by a second access point of the plurality of access points, the client device with the second access point of the plurality of access points;
wherein detecting, by a first access point, signal strength of signals from a client device that is wirelessly connected to the first access point comprises: generating a received signal strength indicator (RSSI) to indicate signal strength of the signals from the first client device, and wherein the threshold level is a RSSI threshold level; and wherein:
multiple access points of the plurality of access points have an overlapping coverage area;
each of the multiple access points has a maximum RSSI and a minimum RSSI of signals from the client device when the client device is within the overlapping coverage area; and
the RSSI threshold is a medium of the maximum RSSI and minimum RSSI of the multiple access points.

2. The method of claim 1, further comprising:
updating, by the second access point, connection status information to indicate the connection of the client device with the second access point.

3. The method of claim 2, further comprising:
transmitting, by the second access point, the updated connection status information of the client device to the access controller.

4. The method of claim 1, further comprising:
transmitting, by the first access point, connection property information associated with the client device to the access controller.

5. The method of claim 4, further comprising:
transmitting, by the access controller, the connection property information associated with the client device to the plurality of access points.

6. The method of claim 1, further comprising:
transmitting, by the first access point, security information associated with the client device to the access controller.

7. The method of claim 6, further comprising:
transmitting, by the access controller, the security information associated with the client device to the plurality of access points.

8. The method of claim 1, further comprising:
receiving, by multiple access points of the plurality of access points, advertisement packets from the client device;
receiving, by the access controller, RSSI information of the advertisement packets from the client device from the multiple access points; and
determining, an access point of the multiple access points with the highest RSSI to be connected with the client device.

9. The method of claim 1, wherein:
multiple access points of the plurality of access points have an overlapping coverage area;
each of the multiple access points has a maximum RSSI and a minimum RSSI of signals from the client device when the client device is within the overlapping coverage area; and
the RSSI threshold is a medium of the maximum RSSI and minimum RSSI of one of the multiple access points.

10. A system for supporting wireless roaming, comprising:
a plurality of access points each including a processor, a memory, and a wireless transceiver; and
a central device a processor, a memory, and an access controller,
wherein each access point is configured to:
detect signal strength of signals from a client device that is wirelessly connected to the access point;
compare the signal strength with a threshold, and if the signal strength is less than the threshold, disconnect the client device from the access point;
transmit a signal indicating the disconnection of the client device to an access controller, and
the access controller is configured to:
update connection status information to indicate the disconnection of the client device from the access point; and
transmit the connection status information of the client device to the plurality of access points; and
wherein the each access point is also configured to connect the client device with the access point in response to receiving the connection status information that indicates disconnection of the client device from another one of the plurality of access points;
wherein each access point is further configured to generate a received signal strength indicator (RSSI) to indicate signal strength of the signals from the first client device; and wherein:
multiple access points of the plurality of access points have an overlapping coverage area;
each of the multiple access points has a maximum RSSI and a minimum RSSI of signals from the client device when the client device is within the overlapping coverage area; and
the RSSI threshold is a medium of the maximum RSSI and minimum RSSI of the multiple access points.

11. The system of claim 10, wherein each access point is further configured to update connection status information to indicate a connection between itself and a client device when connected with the client device.

12. The system of claim 11, wherein each access point is further configured to transmit the updated connection status information of the client device to the access controller.

13. The system of claim 10, wherein each access point is further configured to transmit connection property information associated with a client device, when connected with a client device, to the access controller.

14. The system of claim 13, wherein the access controller is further configured to transmit the connection property information associated with the client device to the plurality of access points.

15. The system of claim 10, wherein each access point is further configured to transmit security information associated with a client device to the access controller, when connected with the client device.

16. The system of claim 15, wherein the access controller is further configured to transmit the security information associated with the client device to the plurality of access points.

17. The system of claim 10, wherein:
multiple access points have an overlapping coverage area where a client device is located, and
the access controller is configured to receive RSSI information of the advertisement packets from the client device from the multiple access points, and determine, an access point of the multiple access points with the highest RSSI to be connected with the client device.

* * * * *